United States Patent
Yamaki et al.

(10) Patent No.: US 9,690,159 B2
(45) Date of Patent: Jun. 27, 2017

(54) DISPLAY DEVICE AND METHOD OF GENERATING SUPPLY POWER THEREFOR

(71) Applicant: Sharp Kabushiki Kaisha, Osaka-shi, Osaka (JP)

(72) Inventors: Kenichiroh Yamaki, Osaka (JP); Toshihiro Yanagi, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 246 days.

(21) Appl. No.: 14/391,206

(22) PCT Filed: Apr. 2, 2013

(86) PCT No.: PCT/JP2013/060065
§ 371 (c)(1),
(2) Date: Oct. 8, 2014

(87) PCT Pub. No.: WO2013/153987
PCT Pub. Date: Oct. 17, 2013

(65) Prior Publication Data
US 2015/0116300 A1 Apr. 30, 2015

(30) Foreign Application Priority Data

Apr. 9, 2012 (JP) ................................ 2012-088449

(51) Int. Cl.
*G02F 1/1368* (2006.01)
*G09G 3/36* (2006.01)

(52) U.S. Cl.
CPC ......... *G02F 1/1368* (2013.01); *G09G 3/3696* (2013.01); *G09G 2310/04* (2013.01);
(Continued)

(58) Field of Classification Search
CPC .. G02F 1/1368; G09G 3/3696; G09G 2310/04; G09G 2330/021;
(Continued)

(56) References Cited

U.S. PATENT DOCUMENTS 5,587,683 A 12/1996 Kawasaki et al.
7,388,614 B2 * 6/2008 Yasuda ............. H04N 5/23212
348/349

(Continued)

FOREIGN PATENT DOCUMENTS

JP 3159586 B2 4/2001
JP 2002-123234 A 4/2002
(Continued)

OTHER PUBLICATIONS

Official Communication issued in International Patent Application No. PCT/JP2013/060065, mailed on Jun. 25, 2013.

*Primary Examiner* — Julie Anne Watko
(74) *Attorney, Agent, or Firm* — Keating & Bennett, LLP

(57) ABSTRACT

A DC-DC converter (600) generates a supply voltage VPW1, etc. for supplying to a drive circuit (500), by converting a voltage level through an operation of a switching element which changes an electric current passing through an inductor. A mode control signal Cm is generated in a power supply control section (220) of the display control circuit (200), and is supplied to the DC-DC converter (600), whereby the DC-DC converter (600) is operated in a PFM control mode during a period when a load condition is light such as during a non-refreshing period in an intermittent driving, whereas the mode is changed to a PWM control mode in the other periods.

13 Claims, 8 Drawing Sheets

(52) U.S. Cl.
CPC ............ *G09G 2330/021* (2013.01); *G09G 2340/0435* (2013.01)

(58) Field of Classification Search
CPC ..... G09G 2340/0435; G09G 2330/022; G09G 2330/02; G09G 2330/00; G09G 2310/061
USPC ...................................... 345/212, 211, 213
See application file for complete search history.

(56) References Cited

U.S. PATENT DOCUMENTS

| | | | |
|---|---|---|---|
| 9,417,682 B2 * | 8/2016 | Nakayama | G06F 1/3265 |
| 9,417,683 B2 * | 8/2016 | Nakayama | G09G 3/3688 |
| 9,495,923 B2 * | 11/2016 | Shiomi | G09G 3/2074 |
| 2002/0036636 A1 | 3/2002 | Yanagi et al. | |
| 2002/0093473 A1 | 7/2002 | Tanaka et al. | |
| 2005/0052170 A1 | 3/2005 | Kim et al. | |
| 2007/0211009 A1 * | 9/2007 | Teranishi | G09G 3/3648 345/98 |
| 2007/0222774 A1 * | 9/2007 | Foster | G06F 3/1431 345/204 |
| 2011/0025673 A1 * | 2/2011 | Chen | H02M 3/156 345/211 |
| 2011/0261043 A1 | 10/2011 | Hayakawa et al. | |

FOREIGN PATENT DOCUMENTS

| | | |
|---|---|---|
| JP | 2002-278523 A | 9/2002 |
| JP | 2005-057999 A | 3/2005 |
| JP | 2011-216663 A | 10/2011 |
| JP | 2011-242763 A | 12/2011 |
| KR | 10-2011-0035443 A | 4/2011 |

* cited by examiner

610u Step-Up DC-DC Converter IC

610r Inversion DC-DC Converter IC

610d Step-Down DC-DC Converter IC

| Panel | 60Hz | | | 60Hz |
|---|---|---|---|---|
| | RF Operation (Load Heavy) | Resting (Load Light) | Resting (Load Light) | RF Operation (Load Heavy) |
| Cm | ‾‾‾‾‾ | ___ | ___ | ‾‾‾‾‾ |
| Control Mode | PWM Control | PFM Control | PFM Control | PWM Control |
| Coversion Efficiency | 85% | 80% | | 85% |

| Panel | 60Hz | | | 60Hz |
|---|---|---|---|---|
| | RF Operation (Load Heavy) | Resting (Load Light) | Resting (Load Light) | RF Operation (Load Heavy) |
| Control Mode | | PWM Control (Fixed) | | |
| Coversion Efficiency | 85% | 35% | | 85% |

# DISPLAY DEVICE AND METHOD OF GENERATING SUPPLY POWER THEREFOR

TECHNICAL FIELD

The present invention relates to display devices and methods of generating supply power therefor. In particular, the invention relates to a display device which has a power supply circuit that generates a supply voltage by converting a DC voltage, and methods of generating the supply power.

BACKGROUND ART

Liquid crystal display devices used in portable electronic appliances such as mobile telephones conventionally include charge-pump power-supply circuits for generation of supply voltages necessary for driving the display devices. Also conventionally, for reduced power consumption in the display devices, such liquid crystal display devices as described sometimes employ a driving method in which gate lines serving as scanning signal lines are scanned and a display image is refreshed in a scanning period (also called "charging period" or "refreshing period") and thereafter all the gate lines are brought into a non-scanning state and the refreshing is stopped in an intermission period (also called "holding period" or "non-refreshing period". This driving method is called, for example, "intermission driving", and is also called "low-frequency driving" or "intermittent driving".

In order to reduce power consumption sufficiently in the liquid crystal display device which uses the intermittent driving, it is also necessary to reduce power consumed by the charge-pump power-supply circuit. As a solution, there is proposed a liquid crystal display device (See Patent Document 1 for example) in which a charge-pump power supply circuit has a reduced pump operation frequency in the non-scanning period than in the scanning period.

There is another arrangement proposed: A liquid crystal drive circuit has a power supply source provided by a voltage boosting circuit device in which a clock signal is supplied as a drive signal to the voltage boosting circuit when the liquid crystal drive circuit has a large consumption current, whereas the voltage boosting circuit stops its operation and a drive signal level is fixed when the liquid crystal drive circuit has a small consumption current (See Patent Document 2 for example).

DOCUMENTS ON CONVENTIONAL ART

Patent Document

Patent Document 1: JP-A 2002-123234 Gazette
Patent Document 2: Japanese Patent No. 3159586 Gazette

SUMMARY OF THE INVENTION

Problems to be Solved by the Invention

Charge-pump power-supply circuits are suitable for supplying a few tens of milli-amperes of current in small, low-resolution liquid crystal display devices. However, as the liquid crystal display devices have liquid crystal panels of higher resolutions or greater sizes, the charge-pump system becomes less suitable, and more difficult to use as a method for driving the power supply circuits for the liquid crystal panel.

It is therefore an object of the present invention to provide a display device which includes a power supply circuit capable of supplying a current necessary for driving a large or high-definition (high-resolution) display panel, and is suitable also in low power consumption configurations provided by, for example, intermittent driving.

Means for Solving the Problems

A first aspect of the present invention provides a display device which has a supply voltage generation function by converting a level of a DC voltage. The display device includes:
a display section for displaying an image;
a drive circuit for driving the display section;
a first DC-DC converter which includes a first induction element and a first switching element for changing an electric current passing through the first induction element; converts a level of an externally inputted DC voltage by operating the first switching element; and supplies a DC voltage resulted from the conversion to the drive circuit as a first supply voltage;
a drive control section for controlling the drive circuit; and
a power supply control section for controlling the first DC-DC converter.

In this arrangement, the first DC-DC converter is capable of switching a control mode for controlling an operation of the first switching element at least between two control modes including a first mode and a second mode which provides a higher power conversion efficiency than the first mode under a predetermined light load condition, and
the power supply control section switches the control mode so that the first DC-DC converter operates in the first mode when the drive circuit is driving the display section whereas the first DC-DC converter operates in the second mode when the drive circuit is not driving the display section.

A second aspect of the present invention provides the first aspect of the present invention, in which
the drive control section controls the drive circuit such that a refreshing period in which a display image in the display section is refreshed and a non-refreshing period in which refreshing of a display image in the display section is stopped appear in an alternating manner, and
the power supply control section switches the control mode so that the first DC-DC converter operates in the first mode during the refreshing period, and in the second mode during the non-refreshing period.

A third aspect of the present invention provides the second aspect of the present invention, in which
the drive control section is capable of switching an operation mode of the drive circuit between a normal driving mode in which only the refreshing period appears repeatedly and an intermittent driving mode in which the refreshing period and the non-refreshing period appear in an alternating manner, and
the power supply control section determines the control mode so that the first DC-DC converter operates in the first mode when the drive circuit is operating in the normal driving mode.

A fourth aspect of the present invention provides the first aspect of the present invention, in which
the drive control section is capable of switching an operation mode of the drive circuit between a normal driving mode in which only the refreshing period appears repeatedly and an intermittent driving mode in which the refreshing period and the non-refreshing period appear in an alternating manner, and the power supply control section switches the control mode so that the first DC-DC converter operates in the first mode when the drive circuit is operating in the normal driving mode whereas the first DC-DC converter operates in the second mode when the drive circuit is operating in the intermittent driving mode.

A fifth aspect of the present invention provides the first through the third aspects of the present invention, in which the first DC-DC converter controls the operation of the first switching element by a pulse width modulation method in the first mode, and in the second mode, controls the operation of the first switching element by a pulse frequency modulation method.

A sixth aspect of the present invention provides the first through the fourth aspects of the present invention, in which the first DC-DC converter controls the operation of the first switching element in the pulse width modulation method in the first mode, and in the second mode, switches the method of controlling the operation of the first switching element, between the pulse width modulation method and the pulse frequency modulation method depending on a load of the first DC-DC converter.

A seventh aspect of the present invention provides the first through fourth aspects of the present invention, in which the display device further includes a second DC-DC converter which has a second induction element and a second switching element for changing an electric current passing through the second induction element; converts a level of an externally inputted DC voltage by operating the second switching element; and supplies a DC voltage resulted from the conversion to the drive circuit as a second supply voltage.

In this arrangement, the second DC-DC converter is capable of switching a control mode of controlling an operation of the second switching element between said at least two control modes, and the power supply control section switches the control mode of the first DC-DC converter independently from the control mode of the second DC-DC converter.

An eighth aspect of the present invention provides a supply power generation method of generating a supply voltage for a display device which includes a display section for displaying an image, a drive circuit for driving the display section and a drive control section for controlling the drive circuit. The method includes:

a voltage level conversion step of converting a level of an externally inputted DC voltage by controlling an operation of a switching element thereby changing an electric current passing through an induction element, and outputting a DC voltage resulted from the conversion as the supply voltage; and a supply power control step of switching a control mode for controlling the operation of the switching element between at least two modes including a first mode and a second mode which provides a higher power conversion efficiency than the first mode under a predetermined light load condition.

In this arrangement, during the supply power control step, the control mode is switched so that the operation of the switching element is controlled by the first mode when the drive circuit is driving the display section whereas the operation of the switching element is controlled by the second mode when the drive circuit is not driving the display section.

A ninth aspect of the present invention provides the eighth aspect of the present invention, in which the drive control section controls the drive circuit such that a refreshing period in which a display image in the display section is refreshed and a non-refreshing period in which refreshing of a display image in the display section is stopped appear in an alternating manner, and in the power control step, the control mode is switched so that the operation of the switching element is controlled in the first mode during the refreshing period, and in the second mode during the non-refreshing period.

Other aspects of the present invention will become clear from the first through the ninth aspects of the present invention and description of embodiments to be given later, so will not be stated here.

Advantages of the Invention

According to the first aspect of the present invention, an electric current passing through an induction element is changed by a switching element, whereby a level of a DC voltage is converted, and a DC voltage resulted from the conversion is supplied to the drive circuit as a supply voltage. Therefore, it is possible to supply a sufficient amount of electric current from the DC-DC converter which serves as a power supply circuit even if the display section is large or of a high-definition (high-resolution) type. The DC-DC converter operates in the first mode when the drive circuit is driving the display section while it operates in the second mode when drive circuit is not driving the display section. With this arrangement, decrease in power conversion efficiency is avoided when the DC-DC converter is under a light load condition. Therefore, it is possible to maintain a high level of power conversion efficiency throughout all of the operation periods of the display device while supplying a sufficient amount of electric current for driving a large or high-definition display section from the DC-DC converter to the drive circuit.

According to the second aspect of the present invention, the DC-DC converter operates in the first mode during the refreshing period while it operates in the second mode during the non-refreshing period. Since this avoids decrease in power conversion efficiency in the non-refreshing period, the arrangement maintains a high power conversion efficiency throughout all of the operation periods of the display device even in cases where an intermittent driving is utilized. Therefore, it is possible to generate a supply voltage at a high conversion efficiency without compromising benefit of reduced power consumption provided by the intermittent driving, while supplying a sufficient amount of electric current for driving a large or high-definition display section from the DC-DC converter.

According to the third aspect of the present invention, the DC-DC converter operates in the first mode when the drive circuit is operating in the normal driving mode, but when the drive circuit is operating in the intermittent driving mode, switching is performed so that the control mode of the DC-DC converter follows the arrangement specified in the second aspect. The arrangement maintains a high power conversion efficiency throughout all of the operation periods of the display device in whichever of the cases where the drive circuit of the display device is operating in the normal driving mode and where it is operating in the intermittent driving mode.

According to the fourth aspect of the present invention, the DC-DC converter operates in the first mode when the drive circuit is operating in the normal driving mode whereas it operates in the second mode when the drive circuit is operating in the intermittent driving mode. The arrangement maintains a high power conversion efficiency throughout all of the operation periods of the display device in whichever of the cases where the drive circuit of the display device is operating in the normal driving mode and where it is operating in the intermittent driving mode.

According to the fifth aspect of the present invention, the operation of the switching element for changing the electric current passing through the induction element in the DC-DC converter is controlled by a pulse width modulation method in the first mode while it is controlled by a pulse frequency modulation method in the second mode. The arrangement makes it possible to maintain a high level of power conversion efficiency throughout all of the operation periods of the display device while supplying a sufficient amount of electric current for driving a large or high-definition display section from the DC-DC converter.

According to the sixth aspect of the present invention, the operation of the switching element for changing the electric current passing through the induction element in the DC-DC converter is controlled by the pulse width modulation method in the first mode, while in the second mode, the method of controlling the operation of the switching element is switched between the pulse width modulation method and the pulse frequency modulation method depending upon a load of the DC-DC converter. The arrangement makes it possible to maintain a high level of power conversion efficiency throughout all of the operation periods of the display device while supplying a sufficient amount of electric current for driving a large or high-definition display section, from the DC-DC converter.

According to the seventh aspect of the present invention, a second DC-DC converter which has the same configuration as the DC-DC converter (first DC-DC converter) generates a supply voltage to be supplied to the drive control section. Switching of the control mode of the second DC-DC converter is performed independently from the control mode of the first DC-DC converter. The arrangement allows for finer control on each of the generating operation of the supply voltage to drive the display section and the generating operation of the supply voltage to drive the drive control section (logic supply voltage). This makes it possible to further improve power conversion efficiency of the entire power supply circuit.

Advantages provided by other aspects of the present invention will become clear from the first through the seventh aspects of the present invention and description of the embodiments to be given below, so will not be stated here.

MODE FOR CARRYING OUT THE INVENTION

Hereinafter, embodiments of the present invention will be described with reference to the attached drawings. In each of the following embodiments, the term "one frame period" means a frame period (16.67 ms) in a typical display device where a refreshing rate of 60 Hz is utilized. However, the frame period in the present invention is not limited to this length.

<1. First Embodiment>
<1. 1 Overall Configuration and Outline of Operation>

Figure 1:
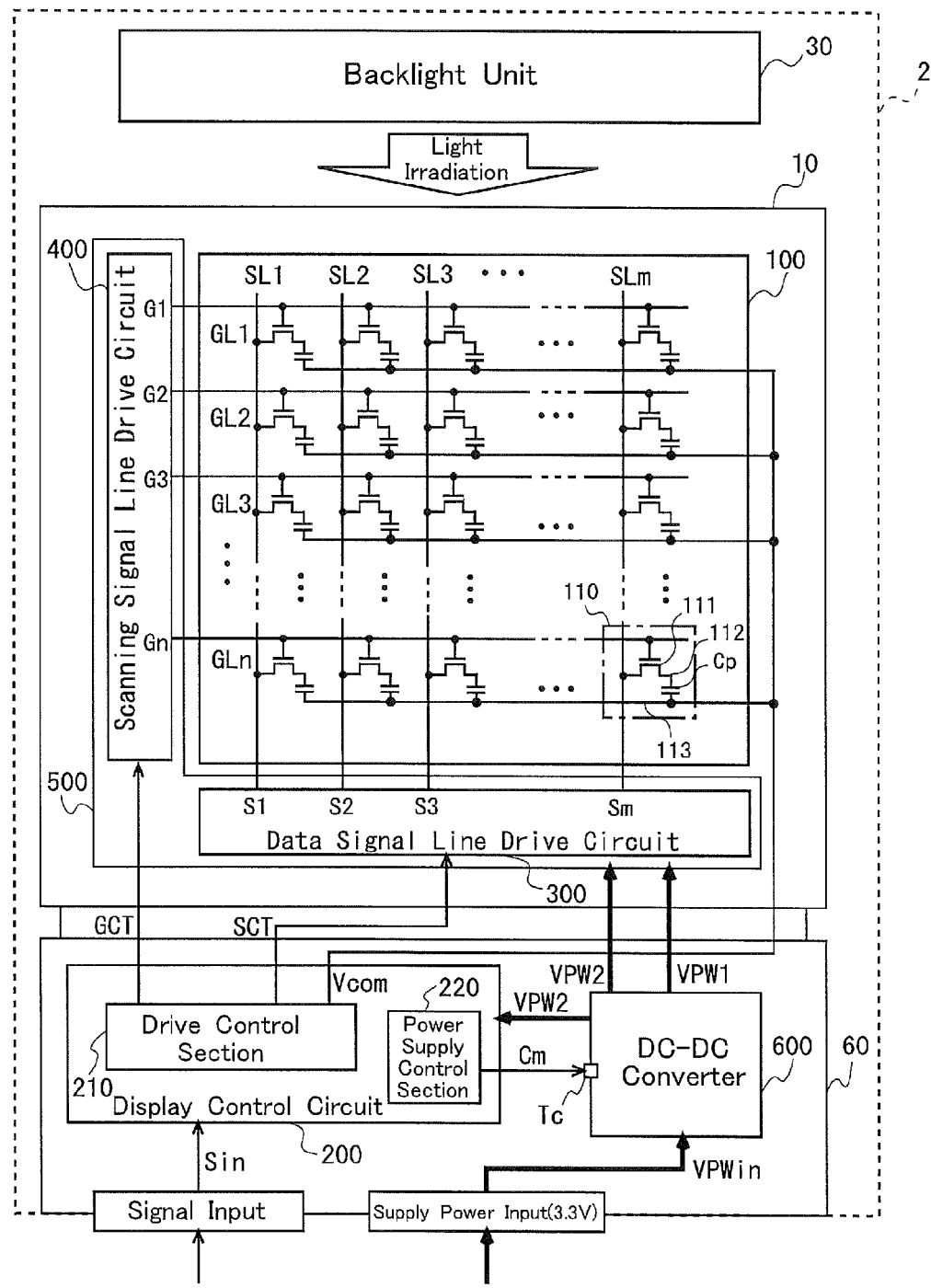
FIG. 1 is a block diagram showing a configuration of a liquid crystal display device according to a first embodiment of the present invention.

FIG. 1 is a block diagram showing a configuration of a liquid crystal display device 2 according to a first embodiment of the present invention. As shown in FIG. 1, a liquid crystal display device 2 includes a liquid crystal display panel 10, a backlight unit 30, and a printed-circuit board 60 mounted with circuits for display control and power supply. The printed-circuit board 60 is supplied with an external signal Sin and a DC supply voltage VPWin, for operation of the liquid crystal display device 2. Hereinafter, this signal Sin will be called "external input signal Sin" or simply "input signal Sin" whereas the supply voltage VPWin will be called "input supply voltage VPWin". The input signal Sin includes data signals which represent an image to be displayed by the liquid crystal display panel 10, and control signals for controlling drive timings of the liquid crystal display panel 10. The input supply voltage VPWin is a DC voltage of 3.3 V for example. The voltage value of the input supply voltage VPWin is not limited to this, but description hereinafter will assume that the value is 3.3 V.

The liquid crystal display panel 10 includes thereon, a display section 100, a data signal line drive circuit 300 and a scanning signal line drive circuit 400. The data signal line drive circuit 300 and the scanning signal line drive circuit 400 constitute a drive circuit 500. Both or one of the data signal line drive circuit 300 and the scanning signal line drive circuit 400 may be formed integrally with the display section 100.

The printed-circuit board 60 is mounted thereon with a display control circuit (also called "timing controller" or "TCON") 200 and a DC-DC converter 600 serving as a power supply circuit. The input signal Sin is supplied to the display control circuit 200, whereas the input supply voltage VPWin is supplied to the DC-DC converter 600.

The display section 100 is formed with a plurality (m) of data signal lines SL1 through SLm, a plurality (n) of scanning signal lines GL1 through GLn, and a plurality (m×n) of pixel formation portions 110 disposed correspondingly to intersections made by the m data signal lines SL1 through SLm and the n scanning signal lines GL1 through GLn. The m×n pixel formation portions 110 are formed in a matrix pattern. Each pixel formation portion 110 is constituted by: a TFT 111 which serves as a switching element having its gate terminal, serving as a control terminal, connected to the scanning signal line GLi that passes through a corresponding one of the intersections while having its source terminal connected to the data signal lines SLj that passes said intersection; a pixel electrode 112 connected to a drain terminal of the TFT 111; a common electrode 113 provided commonly to the m×n pixel formation portions 110; and a liquid crystal layer sandwiched between the pixel electrode 112 and the common electrode 113 and is common to these pixel formation portions 110. In the above, the pixel electrode 112 and the common electrode 113 form a liquid crystal capacitance, which functions as a pixel capacitance Cp. It should be noted here that typically, an auxiliary capacitance is provided in parallel to the liquid crystal capacitance for ensured voltage holding at the pixel capacitance Cp. Therefore, the pixel capacitance Cp is actually constituted by the liquid crystal capacitance and the auxiliary capacitance.

In the present embodiment, the TFT 111 is provided by one which includes, e.g., an oxide semiconductor as a channel layer (hereinafter such a TFT will be called "oxide TFT"). In more detail, the channel layer of the TFT 111 is made of IGZO (InGaZnOx) which is primarily constituted by indium (In), gallium (Ga), zinc (Zn), and oxygen (O). Hereinafter, a TFT which uses IGZO in its channel layer will be called "IGZO-TFT". The IGZO-TFT features remarkably smaller off-leak current than silicon TFTs which use amorphous silicon, for example, in their channel layers. Therefore, IGZO-TFTs are capable of holding a voltage which has been written into the pixel capacitance Cp for a longer time. It should be noted here that the same advantage can be obtained from other oxide semiconductors than IGZO, such as one which uses at least one of indium, gallium, zinc, copper (Cu), silicon (Si), tin (Sn), aluminum (Al), calcium (Ca), germanium (Ge), and lead (Pb) in its channel layer. It should also be noted here that using an oxide TFT as the TFT 111 represents only an example; it is acceptable that others such as a silicon TFT is used in place thereof.

The DC-DC converter 600 on the printed-circuit board 60 changes a level (3.3 V) of the input supply voltage VPWin, and thereby generates a DC supply voltage VPW1 which is necessary for driving the liquid crystal display panel 10 (the display section 100 thereof) (hereinafter this voltage will be called "panel supply voltage"), and a DC supply voltage VPW2 which is necessary for operating a logic section of a circuit inside the liquid crystal display device 2 (hereinafter this voltage will be called "logic supply voltage"). The panel supply voltage VPW1 is supplied to the drive circuit 500 (data signal line drive circuit 300 and the scanning signal line drive circuit 400), whereas the logic supply voltage VPW2 is supplied to the drive circuit 500 (logic section thereof) and the display control circuit 200. The panel supply voltage VPW1 has levels of 10 V, 35 V, and −15 V for example, whereas the logic supply voltage VPW2 has a level of 1.8 V for example.

The display control circuit 200 on the printed-circuit board 60 is implemented typically as an IC (Integrated Circuit), and includes a drive control section 210 and a power supply control section 220. The drive control section 210 generates and outputs a data-side control signal SCT, a scanning-side control signal GCT, and a common potential Vcom, based on the external input signal Sin in order to control the drive circuit 500 (data signal line drive circuit 300 and scanning signal line drive circuit 400). The data-side control signal SCT is supplied to the data signal line drive circuit 300. The scanning-side control signal GCT is supplied to the scanning signal line drive circuit 400. The common potential Vcom is supplied to the common electrode 113. The power supply control section 220 generates a mode control signal Cm for switching a control mode of the DC-DC converter 600 in response to driving of the display section 100 by the data signal line drive circuit 300 and the scanning signal line drive circuit 400. The mode control signal Cm is supplied to the DC-DC converter 600. Generally, the control mode of the DC-DC converter is determined by a method of controlling an operation of a switching element which causes a change in an electric current passing through an inductor (induction element) in the DC-DC converter. Hereinafter, a control mode in which the operation of the switching element is controlled by a pulse width modulation method (PWM method) to bring the DC-DC converter's output voltage level to a target value will be called "PWM control mode", whereas a control mode in which the switching element operation is controlled by a pulse frequency modulation method (PFM method) to bring the DC-DC converter's output voltage level to a target value will be called "PFM control mode".

The data signal line drive circuit 300 generates and outputs driving image signals S1 through Sm to be supplied to the signal lines SL1 through SLm based on the data-side control signal SCT. The data-side control signal SCT contains digital image signals, a source start pulse signal, a source clock signal, a latch strobe signal, etc. In accordance with the source start pulse signal, the source clock signal and the latch strobe signal, the data signal line drive circuit 300 operates its unillustrated shift register, sampling latch circuit, etc., obtains digital signals D1 through Dm based on digital image signals, converts the obtained digital signals with an unillustrated DA conversion circuit, and thereby generates driving image signals S1 through Sm.

The scanning signal line drive circuit 400 repeats application of an active scanning signal Gi to the scanning line GLi (i=1 through n) in accordance with the scanning-side control signal GCT at a predetermined cycle. The scanning-side control signal GCT contains, for example, agate clock signal and a gate start pulse signal. The scanning signal line drive circuit 400 operates its unillustrated shift register, etc. in accordance with the gate clock signal and gate start pulse signal, and thereby generates scanning signals G1 through Gn.

The backlight unit 30 is on a back side of the liquid crystal display panel 10, and irradiate the back surface of the liquid crystal display panel 10 with backlight. The backlight unit 30 typically includes a plurality of LEDs (Light Emitting Diodes). The backlight unit 30 may be controlled by the display control circuit 200, or otherwise. If the liquid crystal display panel 10 is of a reflection type, then it is not necessary to have the backlight unit 30.

In the arrangement as described thus far, driving image signals S1 through Sm are applied to the data signal lines SL1 through SLm respectively; scanning signals G1 through Gn are applied to the scanning signal lines GL1 through GLn respectively; and the backlight unit 30 is driven; whereby an image represented by data signals contained in the external input signal Sin is displayed in the display section 100 of the liquid crystal display panel 10.

<1.2 Configuration and Operation of DC-DC Converter>

Figure 2:
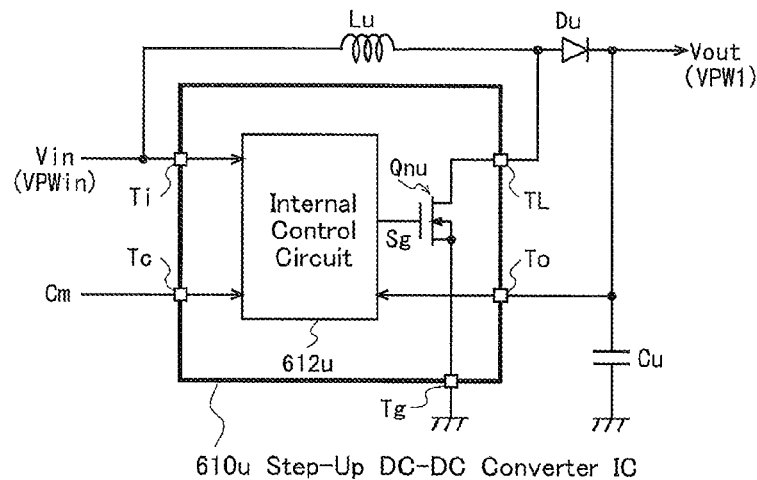
FIG. 2 shows an outline configuration of a step-up section as part of a DC-DC converter in the first embodiment.

FIG. 2 shows an outline configuration of a step-up section of the DC-DC converter 600, i.e., a section for generating a supply voltage VPW1 which has a higher level than that of the input supply voltage VPWin. While the supply voltage VPW1 takes several different supply voltages, the DC-DC converter 600 includes a step-up section as shown in FIG. 2 for each of the positive supply voltages (supply voltages having the same polarity as of the input supply voltage VPWin). The step-up section includes a step-up DC-DC converter IC 610u, an inductor Lu, a diode Du, and a capacitor Cu. The step-up DC-DC converter IC 610u has an N-channel MOS (Metal Oxide Semiconductor) transistor (hereinafter called "Nch transistor") Qnu as a switching element, and an internal control circuit 612u for generating a switching control signal Sg to be supplied to a gate terminal of the Nch transistor Qnu. The DC-DC converter IC 610u also has external terminals, i.e., a voltage input terminal Ti for receiving an input voltage Vin which is an equivalent to the input supply voltage VPWin; a control input terminal Tc for receiving the mode control signal Cm which is for switching an operation control mode of the Nch transistor Qnu; an output voltage terminal To be used to input the stepped-up supply voltage Vout; an element connection terminal TL for connection to the inductor Lu; and a grounding terminal Tg. The Nch transistor Qnu has its drain terminal and source terminal connected to the element connection terminal TL and the grounding terminal Tg respectively.

The input voltage Vin (input supply voltage VPWin) is inputted to the internal control circuit 612u via the voltage input terminal Ti of the DC-DC converter IC 610u, and is also supplied to one terminal of the inductor Lu. Also, the mode control signal Cm which is generated by the power supply control section 220 is inputted to the internal control circuit 612u via the control input terminal Tc. The inductor Lu has its other terminal connected to the element connection terminal TL of the DC-DC converter IC 610u and to an anode of the diode Du. The diode Du has its cathode connected to the output voltage terminal To of the DC-DC converter IC 610u and one terminal of the capacitor Cu. The capacitor Cu has its other terminal grounded. A voltage at a connecting point of the cathode of diode Du and the capacitor Cu, i.e., a voltage at the output voltage terminal To, is outputted as an output voltage Vout. This output voltage Vout is a result of stepping up the input voltage Vin, and is used as a supply voltage which is a constituent of the panel supply voltage VPW1.

The internal control circuit 612u generates a switching control signal Sg as a pulse signal which turns ON/OFF the Nch transistor Qnu. A switching operation of the Nch transistor Qnu caused by this switching control signal Sg changes an electric current passing through the inductor Lu, whereby there is generated the output voltage Vout which has a higher level than the level of the input voltage Vin at the cathode side of the diode Du. The internal control circuit 612u makes adjustment to a pulse width or a pulse frequency of the switching control signal Sg so that the level of the output voltage Vout has a predetermined value (target value). Specifically, when the mode control signal Cm is at HIGH level (H level), the level of the output voltage Vout is brought to the target value by controlling the switching operation of the Nch transistor Qnu using a pulse width modulation method (hereinafter, such a control will be called "PWM control"), and when the mode control signal Cm is at LOW level (L level), the level of the output voltage Vout is brought to the target value by controlling the switching operation of the Nch transistor Qnu using a pulse frequency modulation method (hereinafter, such a control will be called "PFM control"). The target value at this stage is a level of the output voltage Vout, which is higher than the level of the input voltage Vin. Also, it should be noted here that the pulse frequency modulation method to be used here includes pulse skip methods in which switching is based on a fixed-cycle switching operation but can be skipped depending on the load (the same will apply hereinafter).

The step-up DC-DC converter IC to be used in the step-up section of the DC-DC converter 600 is available from the market. Also, the step-up DC-DC converter IC which is configured to operate in the PWM control mode when an H level signal is given as the mode control signal Cm while switching the control methods between the PWM control and the PFM control depending on the load when an L level signal is given as the mode control signal Cm is commercially available (for example, Model RP401x which is available from Ricoh Company, Ltd. in Japan can be used as the DC-DC converter IC 610u).

Figure 3:
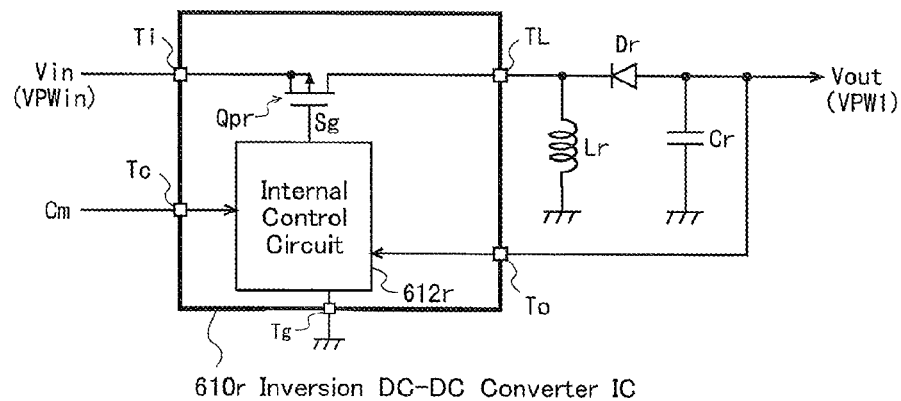
FIG. 3 shows an outline configuration of an inversion section as part of the DC-DC converter in the first embodiment.

FIG. 3 shows an outline configuration of a portion in the DC-DC converter 600 (hereinafter called inversion section) which generates a desired DC voltage having an inversed polarity of the input supply voltage VPWin. While the supply voltage VPW1 has several different supply voltages, the DC-DC converter 600 includes an inversion section as shown in FIG. 3 for each of the supply voltages having a different polarity from that of the input supply voltage VPWin, i.e., for each of the negative source voltages. The inversion section includes an inversion DC-DC converter IC 610r, an inductor Lr, a diode Dr, and a capacitor Cr. The inversion DC-DC converter IC 610r has a P-channel MOS transistor (hereinafter called "Pch transistor") Qpr as a switching element; and an internal control circuit 612r for generation of a switching control signal Sg to be supplied to a gate terminal of the Pch transistor Qpr. The DC-DC converter IC 610r also has external terminals, i.e., a voltage input terminal Ti for receiving an input voltage Vin which is an equivalent to the input supply voltage VPWin; a control input terminal Tc for receiving a mode control signal Cm which is for switching an operation control mode of the Pch transistor Qpr; an output voltage terminal To to be used to input the supply voltage Vout; an element connection terminal TL for connection to the inductor Lr; and a grounding terminal Tg. The Pch transistor Qpr has its drain terminal and source terminal connected to the element connection terminal TL and the voltage input terminal Ti respectively.

The input voltage Vin (input supply voltage VPWin) is supplied to the source terminal of the Pch transistor Qpr via the voltage input terminal Ti of the DC-DC converter IC 610r. The mode control signal Cm which is generated by the power supply control section 220 is inputted to the internal control circuit 612r via the control input terminal Tc. The inductor Lr has one terminal connected to the element connection terminal TL of the DC-DC converter IC 610r and to a cathode of the diode Dr. The other terminal of the inductor Lr is grounded. The diode Dr has an anode connected to one terminal of the capacitor Cr. The capacitor Cr has its other terminal grounded. A voltage at a connecting point of the diode Dr's anode and the capacitor Cr is outputted as an output voltage Vout, and inputted to the internal control circuit 612r via the output voltage terminal To of the DC-DC converter IC 610r. This output voltage Vout is a voltage (negative voltage) made by inverting the polarity and altering the voltage level as well, of the input voltage Vin, and is used as a supply voltage which is a constituent of the panel supply voltage VPW1.

The internal control circuit 612r generates a switching control signal Sg as a pulse signal which turns ON/OFF the Pch transistor Qpr. Through a switching operation of the Pch transistor Qpr caused by the switching control signal Sg, a negative voltage is generated at the anode of the diode Dr. Specifically, when the Pch transistor Qpr is ON, a positive input voltage Vin is applied to the inductor Lr via the Pch transistor Qpr and thus, an electric current flows through the inductor Lr. Then, when the Pch transistor Qpr comes to an OFF state, an electric current flows through the inductor Lr via the diode Dr, whereby the capacitor Cr on the anode side of the diode Dr is charged with a negative voltage. Then, when the Pch transistor Qpr comes to an ON state, a positive voltage (input voltage Vin) is applied to the one terminal of the inductor Lr, namely to the cathode of the diode Dr, but on the anode side of the diode Dr, the capacitor Cr holds the negative voltage. Thus, a negative output voltage Vout is obtained at the anode of the diode Dr, through the switching operation of the Pch transistor Qpr. The level of output voltage Vout is controlled to be a predetermined value (target value) as the internal control circuit 612r adjusts a pulse width or pulse frequency of the switching control signal Sg.

Generally, the inversion DC-DC converter IC is conventional and commercially available, so anyone skilled in the art should be easily able to implement the inversion DC-DC converter 600 as shown in FIG. 3.

Figure 4:
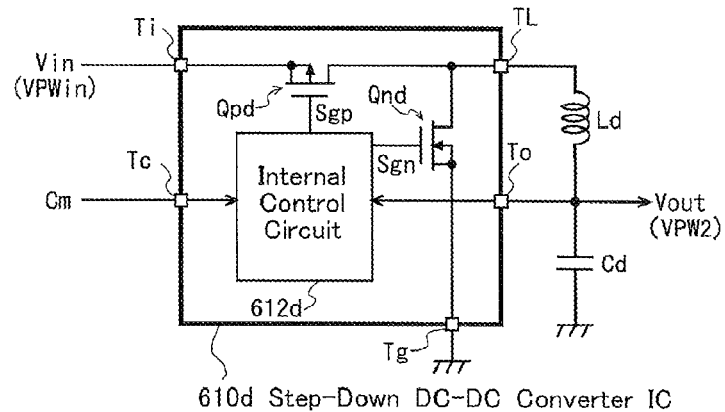
FIG. 4 shows an outline configuration of a step-down section as part of the DC-DC converter in the first embodiment.

FIG. 4 shows an outline configuration of a step-down section of the DC-DC converter 600, i.e., a section for generating a supply voltage VPW2 which has a lower level than that of the input supply voltage VPWin. The DC-DC converter 600 includes a step-down section as shown in FIG. 4 for each of the supply voltages which constitute the source voltage VPW2. The step-down section includes a synchronous-rectification step-down DC-DC converter IC 610d, an inductor Ld and a capacitor Cd. The step-down DC-DC converter IC 610d has a P-channel MOS transistor (Pch transistor) Qpd as a switching element; an N-channel MOS transistor (Nch transistor) Qnd as a switching element; and an internal control circuit 612d for generation of switching control signals Sgp and Sgn to be supplied to gate terminals of the respective Pch transistor Qpd and Nch transistor Qnd. The step-down DC-DC converter IC 610d also has external terminals, i.e., a voltage input terminal Ti for receiving an input voltage Vin which is an equivalent to the input supply voltage VPWin; a control input terminal Tc for receiving the mode control signal Cm which is for switching an operation control mode of the Pch transistor Qpd and Nch transistor Qnd; an output voltage terminal To be used to input the stepped-down supply voltage Vout; an element connection terminal TL for connection to the inductor Ld; and a grounding terminal Tg. The Pch transistor Qpd has its drain terminal and source terminal connected to the element connection terminal TL and the voltage input terminal Ti respectively, whereas the Nch transistor Qnd has its drain terminal and source terminal connected to the element connection terminal TL and the grounding terminal Tg respectively.

The input voltage Vin (input supply voltage VPWin) is supplied to the source terminal of the Pch transistor Qpr via the voltage input terminal Ti of the DC-DC converter IC 610d. The mode control signal Cm which is generated by the power supply control section 220 is inputted to the internal control circuit 612d via the control input terminal Tc. The element connection terminal TL and the output voltage terminal To of the DC-DC converter IC 610d are connected to one terminal of the inductor Ld and the other thereof, respectively. Also, the output voltage terminal To is connected to one terminal of the capacitor Cd, whereas the capacitor Cd has its other terminal grounded. A voltage at a connecting point of the inductor Ld and the capacitor Cd, i.e., a voltage at the output voltage terminal To, is outputted as an output voltage Vout. This output voltage Vout is a result of stepping down the input voltage Vin, and is used as a supply voltage to constitute the logic supply voltage VPW2.

The switching control signals Sgp and Sgn generated by the internal control circuit 612d are pulse signals which turn ON/OFF the Pch transistor Qpd and the Nch transistor Qnd in a reciprocal manner. Reciprocal switching operations of the Pch transistor Qpd and the Nch transistor Qnd by these switching control signals Sgp and Sgn change an electric current passing through the inductor Ld, whereby there is generated an output voltage which has a lower level than the input voltage Vin, at the connecting point of the inductor Ld and the capacitor Cd (output voltage terminal To). The internal control circuit 612d makes adjustment to a pulse width or a pulse frequency of the switching control signals Sgp, Sgn so that the level of the output voltage Vout has a predetermined value (target value). Specifically, when the mode control signal Cm is at HIGH level, the internal control circuit 612d brings the level of the output voltage Vout to the target value by controlling the switching operations of the Pch transistor Qpd and the Nch transistor Qnd using a pulse width modulation method (i.e., PWM control is performed), and when the mode control signal Cm is at L level, the circuit brings the level of the output voltage Vout to the target value by controlling the switching operations of the Pch transistor Qpd and the Nch transistor Qnd using a pulse frequency modulation method (i.e., PFM control is performed).

The step-down DC-DC converter IC which is usable in the step-down section in the DC-DC converter 600 is commercially available (for example, an IC having a Model Number RP904Z available from Ricoh Company, Ltd. in Japan can be used as the DC-DC converter IC 610d). Also, the step-down DC-DC converter IC which is configured to operate in the PWM control mode when an H level signal is given as the mode control signal Cm while switching the control methods between the PWM control and the PFM control depending on the load when an L level signal is given as the mode control signal Cm is commercially available (for example, an IC which has a Model Number RP500x and is available from Ricoh Company, Ltd. in Japan can be used as the DC-DC converter IC 610d).

As has been described, the step-up section, the inversion section, and the step-down section of the DC-DC converter 600 according to the present embodiment are configured as shown in FIG. 2, FIG. 3 and FIG. 4 respectively. However, the configuration of the DC-DC converter usable in the present invention is not limited to those described; any configuration will be acceptable as far as a DC voltage level is changed through switching operation which causes a change in an electric current passing through an induction element, and the switching element operation control method can be switched from one to another so as to avoid decrease in power conversion efficiency under light load situations. Also, two or all of the step-up, inversion and step-down DC-DC converters IC 610u, 610r, 610d shown in FIG. 2, FIG. 3, and FIG. 4 respectively, may be implemented as a single IC. Further, instead of using these DC-DC converters IC 610u, 610r, 610d, part or all of the functions of these DC-DC converters IC 610u, 610r, 610d may be incorporated in the display control circuit 200 or another IC which is used as a system driver 700 (FIG. 14) to be described later.

<1.3 Operation>

The liquid crystal display device according to the present embodiment is capable of switching an operation mode of the drive circuit 500 between a normal driving mode and an intermittent driving mode. The normal driving mode is an operation mode composed only of a refreshing period, i.e., a mode in which refreshing of a display image in the display section 100 is repeated. The intermittent driving mode is an operation mode composed of two kinds of periods appearing in an alternating manner; the refreshing period in which a display image in the display section 100 is refreshed, and a non-refreshing period in which refreshing of the display image in the display section 100 is stopped. Determination as to which one of these normal driving mode and intermittent driving mode should be used can be made with a predetermined control signal supplied externally or with a predetermined setting switch (not illustrated). These normal driving mode and intermittent driving mode can also be regarded as operation modes of the liquid crystal display device.

<1.3.1 Operation in Intermittent Driving Mode>

Figures 5, 6, 7:
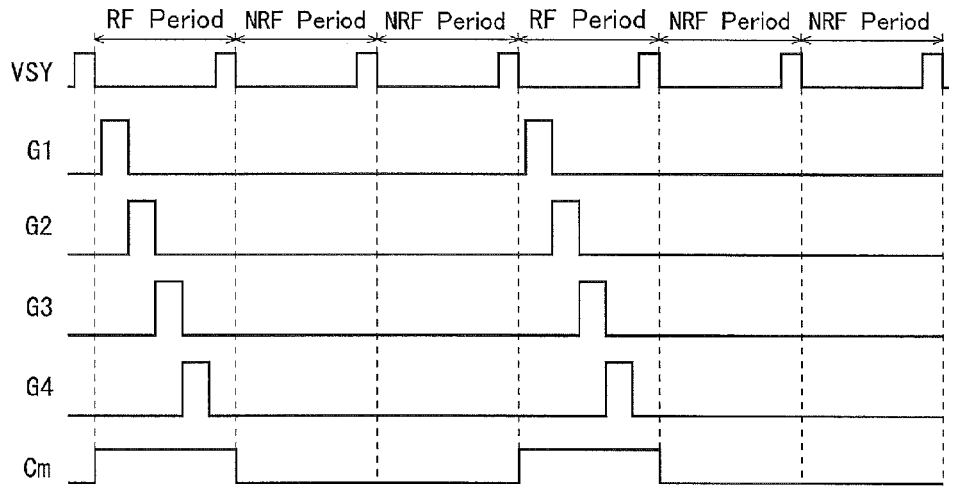
FIG. 5 is signal waveform chart for describing an operation of the liquid crystal display device according to the first embodiment in an intermittent driving mode.
FIG. 6 is a timing chart for describing an operation of the DC-DC converter when the liquid crystal display device according to the first embodiment is operating in the intermittent driving mode.
FIG. 7 is a timing chart for describing an operation of a DC-DC converter when a conventional liquid crystal display device is operating in the intermittent driving mode.

FIG. 5 is a signal waveform chart for describing an operation of the liquid crystal display device according to the present embodiment, in the intermittent driving mode. For the sake of descriptive convenience, FIG. 5 assumes the number of scanning signal lines n=4 (the same applies to FIG. 8, FIG. 9, FIG. 10, FIG. 12 and FIG. 13 to be described later). In the present embodiment, whenever there is an image displayed in the display section 100, a pixel voltage which is held as a pixel data at a pixel capacitance Cp in each of the pixel formation portions 110 in the display section 100 is re-written at a predetermined cycle. Specifically, a display image in the display section 100 is refreshed at a predetermined cycle. In the intermittent driving mode according to the present embodiment, the refreshing cycle is made of three frame periods, composed of one frame period as the refreshing period, and two frame periods that follow as the non-refreshing periods. It should be noted here that the refreshing cycle may be made of any number of periods as far as it is not shorter than two frame periods; a specific number thereof is determined with consideration, for example, of how often the display section 100 will change the image to be displayed therein. For example, the refreshing cycle may be 60 frame periods composed of 1 frame period as the refreshing period (hereinafter may also called "RF period") and 59 frame periods that follow as the non-refreshing periods. In this case, the refreshing rate is 1 Hz. Also, the refreshing period may be two frame periods or longer (the same applies to the other embodiments which will be described later).

As shown in FIG. 5, the drive control section 210 in the present embodiment generates a vertical synchronization signal VSY which assumes H level for a predetermined period per one frame period (1 vertical period), and supplies this vertical synchronization signal VSY to the scanning signal line drive circuit 400 as one of the scanning-side control signals GCT.

In the frame period which falls under the refreshing period, scanning signals G1 through G4 are applied to the scanning signal lines GL1 through GL4 respectively in the display section 100, and sequentially become active (H level) during an effective vertical scanning period (i.e., a period excluding a vertical blanking period that includes a period when the vertical synchronization signal assumes H level). Also, during the effective vertical scanning period of the refreshing period, driving image signals S1 through Sm which represent an image to be displayed are applied to the data signal lines SL1 through SLm respectively in the display section 100. As a result, pixel voltages, each representing one of the pixels which make up an image that is to be displayed, are written into the pixel formation portions 110 (pixel capacitances Cp therein) as pixel data.

In the frame period which falls under the non-refreshing period, all of the scanning signals G1 through G4 are non-active (L level), so all of the scanning signal lines GL1 through GL4 in the display section 100 are in the de-selected state. Thus, during the non-refreshing period, pixel data written into the pixel formation portions 110 in the display section 100 during the previous refreshing period are held as they are, whereby the image displayed in the display section 100 continues to be as of the end of the said previous refreshing period. According to such a non-refreshing period as described, the drive circuit 500 (the data signal line drive circuit 300 and the scanning signal line drive circuit 400) stops driving the display section 100, and therefore power consumption in the drive circuit 500 decreases dramatically. Specifically, the DC-DC converter 600 which supplies the drive circuit 500 with the supply voltage VPW1 comes under a drastically reduced load.

In the intermittent driving mode in which a refreshing period and a non-refreshing period appear alternatingly with each other as described, there is a drastic difference in the power consumption by the drive circuit 500 between the refreshing period and the non-refreshing period. This causes a drastic difference in the load on the DC-DC converter 600, and in response thereto, control mode of the DC-DC converter 600 is switched. In other words, as shown in FIG. 5, the mode control signal Cm which is inputted from the power supply control section 220 to the DC-DC converter 600 assumes H level in the refreshing period but assumes L level in the non-refreshing period. It should be noted here that although FIG. 5 shows a mode control signal Cm which assumes H level throughout the entire refreshing period, the signal configuration may be different; for example, the mode control signal Cm may assume L level during a period when the vertical synchronization signal VSY assumes H level, or during a vertical blanking period in each refreshing period. This is because, while the drive circuit 500 drives the display section 100 in each refreshing period, there is a period, in a more detailed view, when the drive circuit 500 does not actually drive the display section 100, i.e., during the vertical blanking period which includes the period when the vertical synchronization signal VSY assumes H level, in each of the refreshing period.

FIG. 6 is a timing chart for describing an operation of the DC-DC converter 600 in the intermittent driving mode. In the refreshing period, pixel data is written into each of the pixel formation portions 110 to refresh a display image in the display section 100, so the load of the DC-DC converter 600 is relatively high. During the time when the liquid crystal display panel 10 is in the refreshing operation as described, the mode control signal Cm is at H level as shown in FIG. 6 and therefore, the DC-DC converter 600 is operating in the PWM control mode. Specifically, operation of the internal switching element (Nch transistor Qnu within the step-up DC-DC converter IC 610u in FIG. 2) is controlled by pulse width modulation method so that a panel supply voltage VPW1 which is to be generated will have a predetermined level (target value). Generally, DC-DC converters operating in a PWM control mode have a relatively high power conversion efficiency when the load is high. The term power conversion efficiency used herein, may also be called simply as "conversion efficiency", and refers to a ratio of the power which is supplied from the DC-DC converter, to the power supplied to the DC-DC converter. In the present embodiment, the DC-DC converter 600 operating in the PWM control mode in the refreshing period has a power conversion efficiency of 85% for example.

During the non-refreshing period, all the scanning signal lines GL1 through GL4 are in the de-selected state, no scanning is performed, and the drive circuit 500 is virtually resting as has been described, and therefore the load on the DC-DC converter 600 is very much smaller than during the refreshing period. During the time when the liquid crystal display panel 10 is resting because the drive circuit 500 is virtually resting, the mode control signal Cm is at L level as shown in FIG. 6 and therefore, the DC-DC converter 600 is operating in the PFM control mode. Specifically, operation of the internal switching element (Nch transistor Qnu within the step-up DC-DC converter IC 610u in FIG. 2) is controlled by pulse frequency modulation method so that a panel supply voltage VPW1 which is to be generated has a predetermined level (target value). Generally in DC-DC converters operating in a PWM control mode, decrease in the load does not lead to decrease in internal switching loss, etc., so, their power conversion efficiency decreases when the load decreases. In contrast, it is possible to improve power conversion efficiency under light load conditions if DC-DC converters are driven in the PFM control mode. In the present embodiment, the DC-DC converter 600 operating in the PFM control mode in the non-refreshing period, i.e., when the liquid crystal display panel 10 is resting, has a power conversion efficiency of 80% for example.

FIG. 7 is a timing chart for describing an operation of the DC-DC converter when a conventional liquid crystal display device is operating in the intermittent driving mode. In conventional liquid crystal display devices, DC-DC converters used therein operate under PWM control regardless of whether it is operating in the refreshing period or in the non-refreshing period. As a result, power conversion efficiency in the non-refreshing period when the DC-DC converter is under alight load, i.e., when the liquid crystal display panel is resting, is low (35% for example).

As will be clear from comparison between FIG. 6 and FIG. 7, according to the present embodiment, power conversion efficiency in the liquid crystal display device 2 throughout all of its operation periods is significantly improved over the conventional devices since the DC-DC converter 600 operates its switching element (the Nch transistor Qnu) in a PWM method during the refreshing period but it uses a PFM method during the non-refreshing period.

It should be noted here that in the DC-DC converter 600 according to the present embodiment, the step-up section (FIG. 2) which generates the panel supply voltage VPW1 operates in a PFM control mode in the non-refreshing period, but the step-down section (FIG. 4) which generates the logic supply voltage VPW2 operates in a PWM control mode even in the non-refreshing period. However, it is acceptable to bring the drive control section 210 into a resting state and operate the step-down section to generate the logic supply voltage VPW2 in a PFM control mode in the non-refreshing period if there is no need for receiving any external input signal Sin during the non-refreshing period.

<1.3.2 Operation in Normal Driving Mode>

Figure 8:
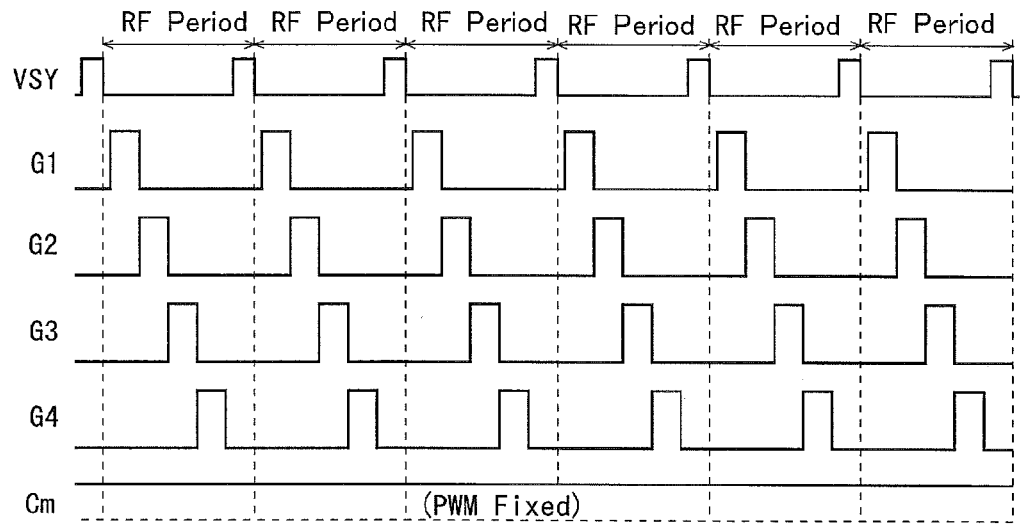
FIG. 8 is a timing chart for describing an operation of the DC-DC converter when the liquid crystal display device according to the first embodiment is operating in a normal driving mode.

FIG. 8 is a signal waveform chart for describing an operation of the liquid crystal display device according to the present embodiment, in the normal driving mode. The drive control section 210 in the present embodiment generates the vertical synchronization signal VSY which assumes H level for a predetermined period per one frame period (1 vertical period), and supplies this vertical synchronization signal VSY to the scanning signal line drive circuit 400 as one of the scanning-side control signals GCT. In the normal driving mode, only the refreshing period appears repeatedly as shown in FIG. 8. Specifically, in an effective vertical scanning period of each frame period, scanning signals G1 through G4 are applied to the scanning signal lines GL1 through GL4 respectively in the display section 100, and sequentially become active (H level); also driving image signals S1 through Sm which represent an image to be displayed are applied to the data signal lines SL1 through SLm respectively in the display section 100. As a result, pixel voltages, each representing one of the pixels which make up an image to be displayed, are written into the pixel formation portions 110 (pixel capacitances Cp) as pixel data. Specifically, the display image in the display section 100 is refreshed in each frame period.

In the normal driving mode where only the refreshing period appears repeatedly, the mode control signal Cm which is inputted from the power supply control section 220 to the DC-DC converter 600 is always at H level as shown in FIG. 8. Therefore, the DC-DC converter 600 always operates in the PWM control mode. In the normal driving mode, the load of the DC-DC converter 600 is high in almost all of the period, and therefore the DC-DC converter 600 has a high power conversion efficiency in almost all of the period.

<1.4 Advantages>

According to the present embodiment described above, supply voltages VPW1, VPW2 are generated by using a DC-DC converter 600 which converts a voltage level by using switching elements thereby changing electric currents which pass through inductors. Hence, it is possible to supply a sufficient amount of electric currents from the DC-DC converter 600, even to a drive circuit of a large or high-definition (high-resolution) liquid crystal display panel which is too big for a charge-pump power supply circuit to supply the amount.

In a conventional liquid crystal display device which uses such a DC-DC converter as described above as its power supply circuit, the DC-DC converter is always operating under a PWM control and for this reason, a power conversion efficiency decreases in the non-refreshing period when its liquid crystal display device is operating in the intermittent driving mode (see FIG. 7). On the contrary, according to the present embodiment, the DC-DC converter 600 operates in a PWM control mode in the refreshing period but the control mode is switched to operate in a PFM control mode in the non-refreshing period, and therefore it is possible to maintain a high power conversion efficiency throughout all of its entire operation periods even in cases where the intermittent driving is utilized (see FIG. 6).

With the arrangement described above, it is possible according to the present embodiment to generate supply voltages at a high conversion efficiency without compromising the benefit of power consumption obtained from the intermittent driving while supplying a sufficient amount of power for driving a large or high-definition liquid crystal display panel from the power supply circuit (DC-DC converter) to the drive circuit.

<1.5 Variations>

Figure 9:
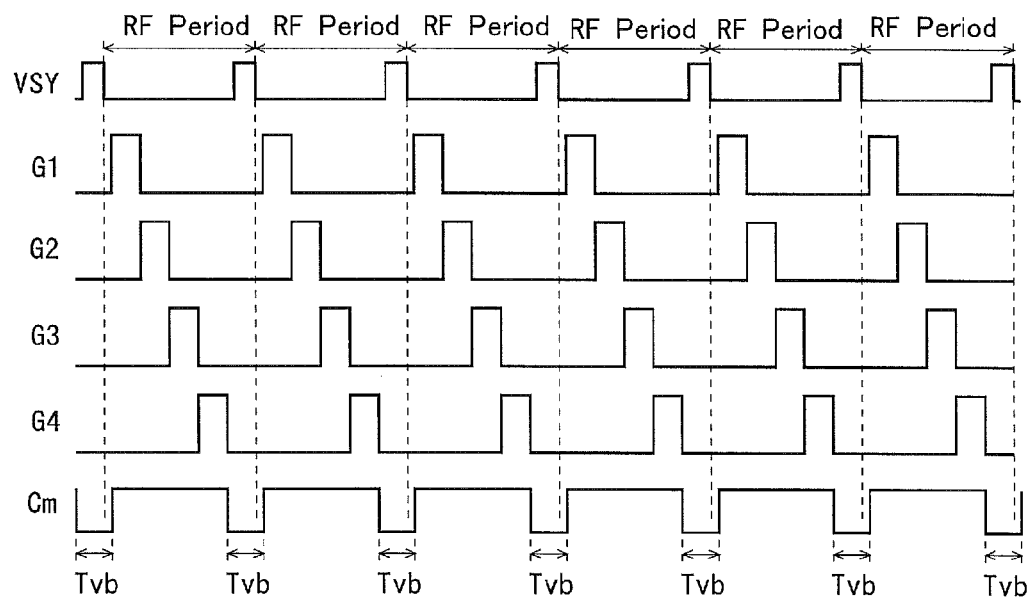
FIG. 9 is signal waveform chart for describing an operation of a liquid crystal display device according to a first variation of the first embodiment in a normal driving mode.
Figure 10:
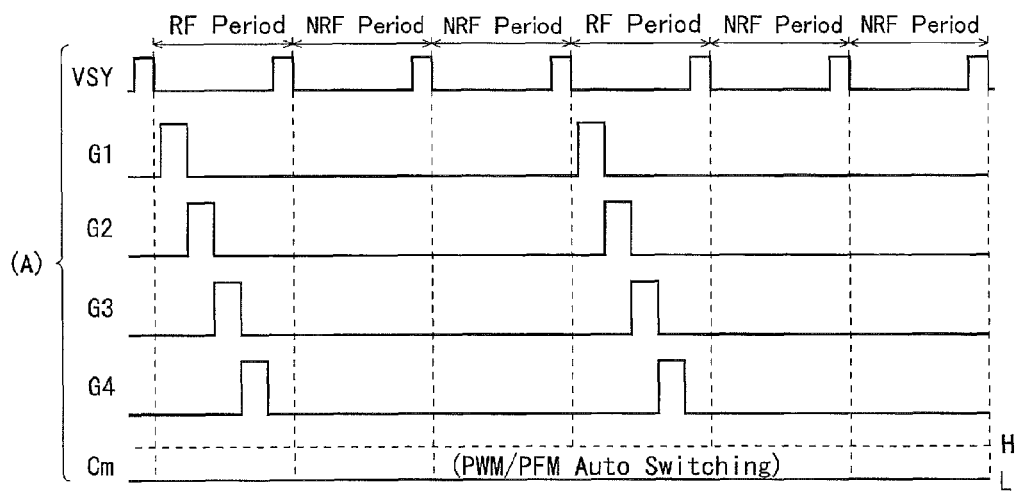
FIG. 10(A) is a signal waveform chart for describing an operation of a liquid crystal display device according to a second variation of the first embodiment, in the intermittent driving mode.
FIG. 10(B) is a signal waveform chart for describing an operation of the liquid crystal display device according to the second variation in the normal driving mode.
Figure 10:
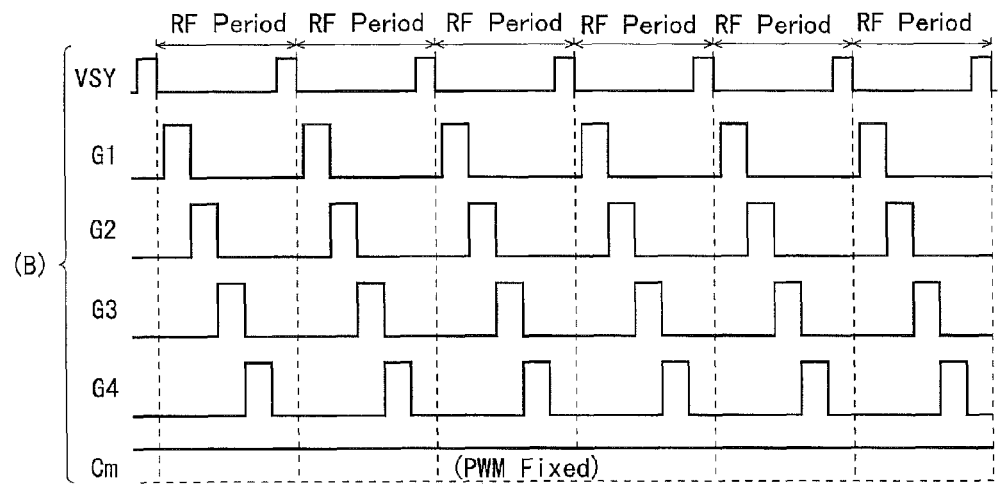

In the first embodiment, neither the data signal lines SL1 through SLm nor the scanning signal lines GL1 through GLn are driven (the display section 100 is resting) during the vertical blanking period which includes the period when the vertical synchronization signal VSY assumes H level, i.e., during the period other than the effective vertical scanning period. Therefore, power consumption of the drive circuit 500 during this period is dramatically smaller than in the effective vertical scanning period. Hence, the arrangement may be varied as shown in FIG. 9, i.e., in the normal driving mode, the mode control signal Cm which is inputted from the power supply control section 220 to the DC-DC converter 600 assumes L level in the vertical blanking period Tvb, but stays at H level in all the other periods. According to such an arrangement as the above, the DC-DC converter 600 operates in the PFM control mode in the vertical blanking period Tvb when the load is light, and for this reason power conversion efficiency becomes higher than in the arrangement in which the mode control signal Cm always stays at H level (FIG. 8).

Whereas the DC-DC converter 600 according to the first embodiment operates in a PWM control mode when the mode control signal Cm is at H level and operates in a PFM control mode when the mode control signal Cm is at L level, this may be varied into an arrangement in which the converter operates in the PWM control when the mode control signal Cm is at H level, but when the mode control signal Cm is at L level, operation method is selected between the PWM control and the PFM control depending upon the load. If the DC-DC converter 600 is arranged as described above, the power supply control section 220 should be arranged to output an L-level mode control signal Cm in the intermittent driving mode as shown in FIG. 10(A) and to output an H-level mode control signal Cm in the normal driving mode as shown in FIG. 10(B). According to this arrangement, the DC-DC converter 600 operates in the PWM control mode when it is under a heavy load or when the display section 100 is being driven in the state of refreshing operation in the refreshing period, whereas during the non-refreshing period or the vertical blanking period when the display section 100 is resting, the converter operates in the PFM control mode since the load is significantly lighter. Therefore, use of the DC-DC converter 600 arranged as described above also provides the same advantages as those provided by the first embodiment or by the variation shown in FIG. 9.

<2. Second Embodiment>

Figure 11:
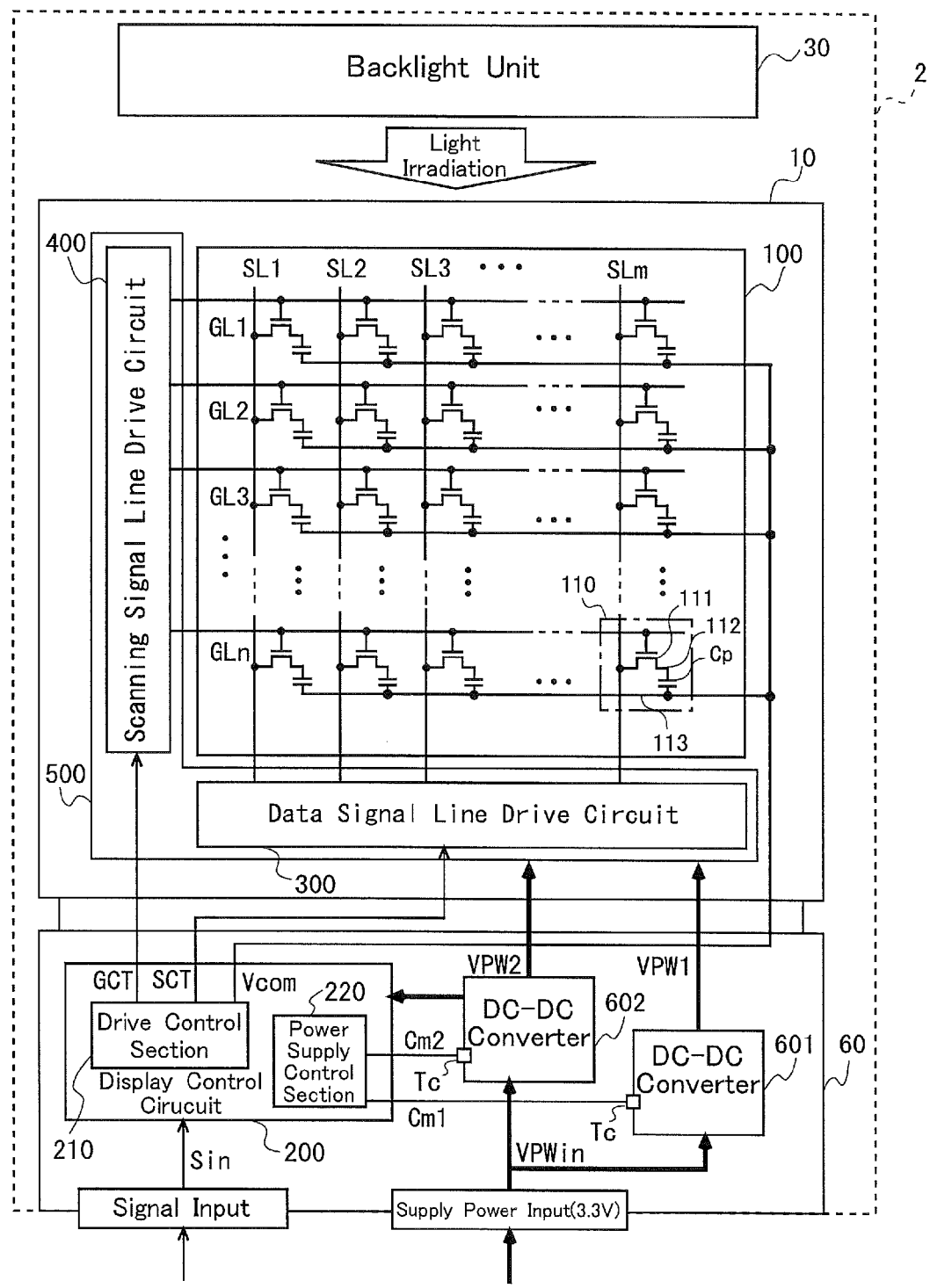
FIG. 11 is a block diagram showing a configuration of a liquid crystal display device according to a second embodiment of the present invention.

FIG. 11 is a block diagram showing a configuration of a liquid crystal display device 2 according to a second embodiment of the present invention. As shown in FIG. 11, the liquid crystal display device 2 includes, as does the first embodiment, a liquid crystal display panel 10, a backlight unit 30, and a printed-circuit board 60 mounted with circuits for display control and power supply. However, the printed-circuit board 60 in the present embodiment is mounted with two DC-DC converters provided by a first and a second DC-DC converters 601, 602 as the power supply circuit, in place of the DC-DC converter 600. Also, the printed-circuit board 60 according to the present embodiment has a display control circuit 200 which includes a drive control section 210 and a power supply control section 220. The power supply control section 220 outputs two mode control signals consisting of a first and a second mode control signals Cm1, Cm2. These first and second mode control signals Cm1, Cm2 are inputted to the first and the second DC-DC converters 601, 602 respectively. Except for these differences regarding the display control circuit 200 and the power supply circuit (the first and the second DC-DC converters 601, 602), the arrangement is the same as in the first embodiment, so the same or corresponding parts or components will be indicated with the same reference symbols, and detailed descriptions thereof will not be repeated.

Figure 12:
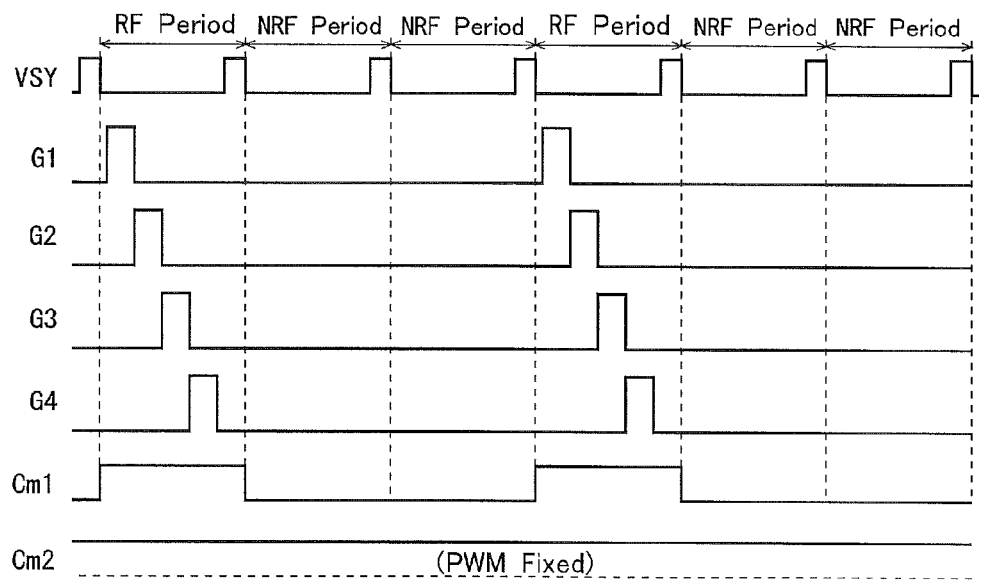
FIG. 12 is a signal waveform chart for describing an operation of the liquid crystal display device according to the second embodiment, in the intermittent driving mode.

FIG. 12 is a signal waveform chart for describing an operation of the liquid crystal display device according to the present embodiment, in the intermittent driving mode. Again, in the present embodiment, a display image in the display section 100 is refreshed at a predetermined refreshing cycle in the intermittent driving mode; the refreshing period cycle has three frame periods, composed of one frame period as a refreshing period and two frame periods that follow as non-refreshing periods.

The drive circuit (the data signal line drive circuit 300 and the scanning signal line drive circuit 400) in the present embodiment operates identically as in the first embodiment, as shown in FIG. 12.

Of the first and the second mode control signals Cm1, Cm2 which are generated by the power supply control section 220 in the present embodiment, the first mode control signal Cm1 assumes H level in the refreshing period and L level in the non-refreshing period, as shown in FIG. 12. It should be noted here that although FIG. 12 shows that the first mode control signal Cm1 assumes H level throughout the entire refreshing period, different signal configurations are acceptable; for example, the first mode control signal Cm1 may assume L level during a period when the vertical synchronization signal VSY assumes H level in each refreshing period, or during a vertical blanking period. The second mode control signal Cm2 always assumes H level.

The first DC-DC converter 601 is built by using a plurality of step-up sections of a configuration as shown in FIG. 2 for example. The first DC-DC converter 601 receives an input supply voltage VPWin and changes (boosts) a voltage level thereof, thereby generating a panel supply voltage VPW1. The panel supply voltage VPW1 is supplied to the drive circuit 500. In generating the panel supply voltage VPW1, the first DC-DC converter 601 follows the first mode control signal Cm1, operating in the PWM control mode during the refreshing period while operating in the PFM control mode during the non-refreshing period. Hence, a high level of power conversion efficiency is maintained in the first DC-DC converter 601 not only in the refreshing period but also in the non-refreshing period.

The second DC-DC converter 602 is built by using a step-down section of a configuration as shown in FIG. 4 for example. The second DC-DC converter 602 receives the input supply voltage VPWin and changes (lowers) a voltage level thereof, thereby generating a logic supply voltage VPW2. The logic supply voltage VPW2 is supplied to the drive circuit 500 (the logic section thereof) and the display control circuit 200. Since the second mode control signal Cm2 is always at H level, the second DC-DC converter 602 always operates in the PWM control mode.

Figure 13:
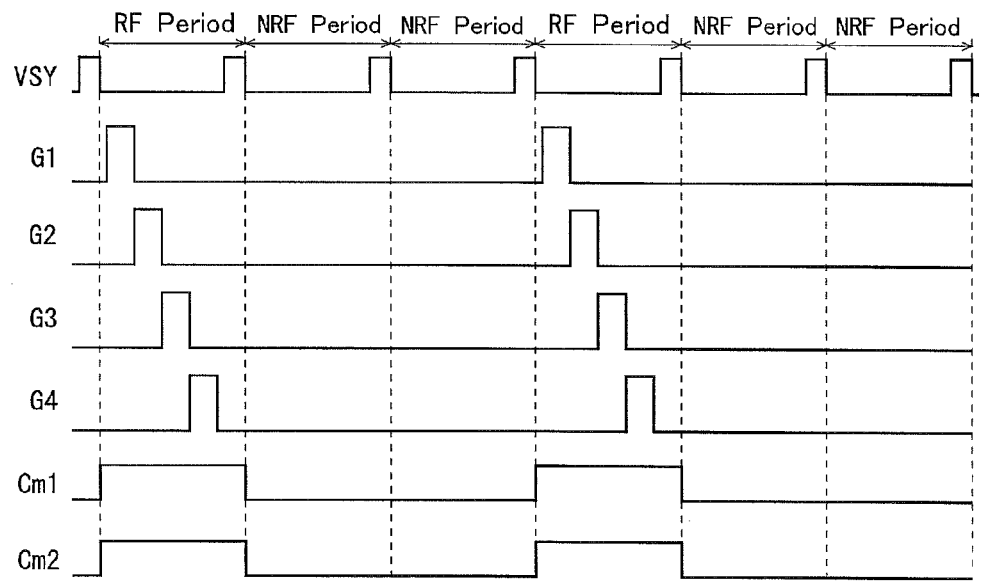
FIG. 13 is a signal waveform chart for describing an operation of a liquid crystal display device according to a variation of the second embodiment, in the intermittent driving mode.

However, in cases where there is no need for receiving the input signal Sin in the non-refreshing period, there may be an arrangement as shown in FIG. 13 that the drive control section 210 is resting during the non-refreshing period with the second mode control signal Cm2 assuming L level, so that the second DC-DC converter 602 which generates the logic supply voltage VPW2 also operates in the PFM control mode during the non-refreshing period. Another arrangement may be that the drive control section 210 keeps its normal operation in the non-refreshing period, whereas the second mode control signal Cm2 is designed to assume L level during a period when the vertical synchronization signal VSY assumes H level or during a vertical blanking period, but assumes H level in all the other periods. Further, switching patterns of the control mode by means of the second mode control signal Cm2 are not limited to the examples described so far but may be any as long as the second mode control signal Cm2 assumes L level when power consumption by the drive control section 210 and the drive circuit 500 is small enough (when the load to the second DC-DC converter 602 is lighter than a predetermined level), e.g., when their logic sections are resting, whereas the second mode control signal Cm2 assumes H level in other periods.

According to the present embodiment described thus far, it is possible, like in the first embodiment, to maintain a high level of power conversion efficiency while supplying a sufficient amount of electric current for driving a large or high-definition liquid crystal display panel from the power supply circuit (DC-DC converter 601) to the drive circuit, even in applications where the intermittent driving is utilized. Further, according to the present embodiment, it is possible with the first and the second mode control signals Cm1, Cm2, to control the control modes of the first DC-DC converter 601 and the control mode of the second DC-DC converter 602 independently from each other. The arrangement allows for finer control on each of the generating operation of panel supply voltage VPW1 and the generating operation of the logic supply voltage VPW2 individually from each other by using the first and the second mode control signals Cm1, Cm2, closely following operating status of the drive control section 210 and the drive circuit 500. This makes it possible to further improve power conversion efficiency of the first and the second DC-DC converters 601, 601, i.e., of the power supply circuit constituted thereby.

<3. Third Embodiment>

Figure 14:
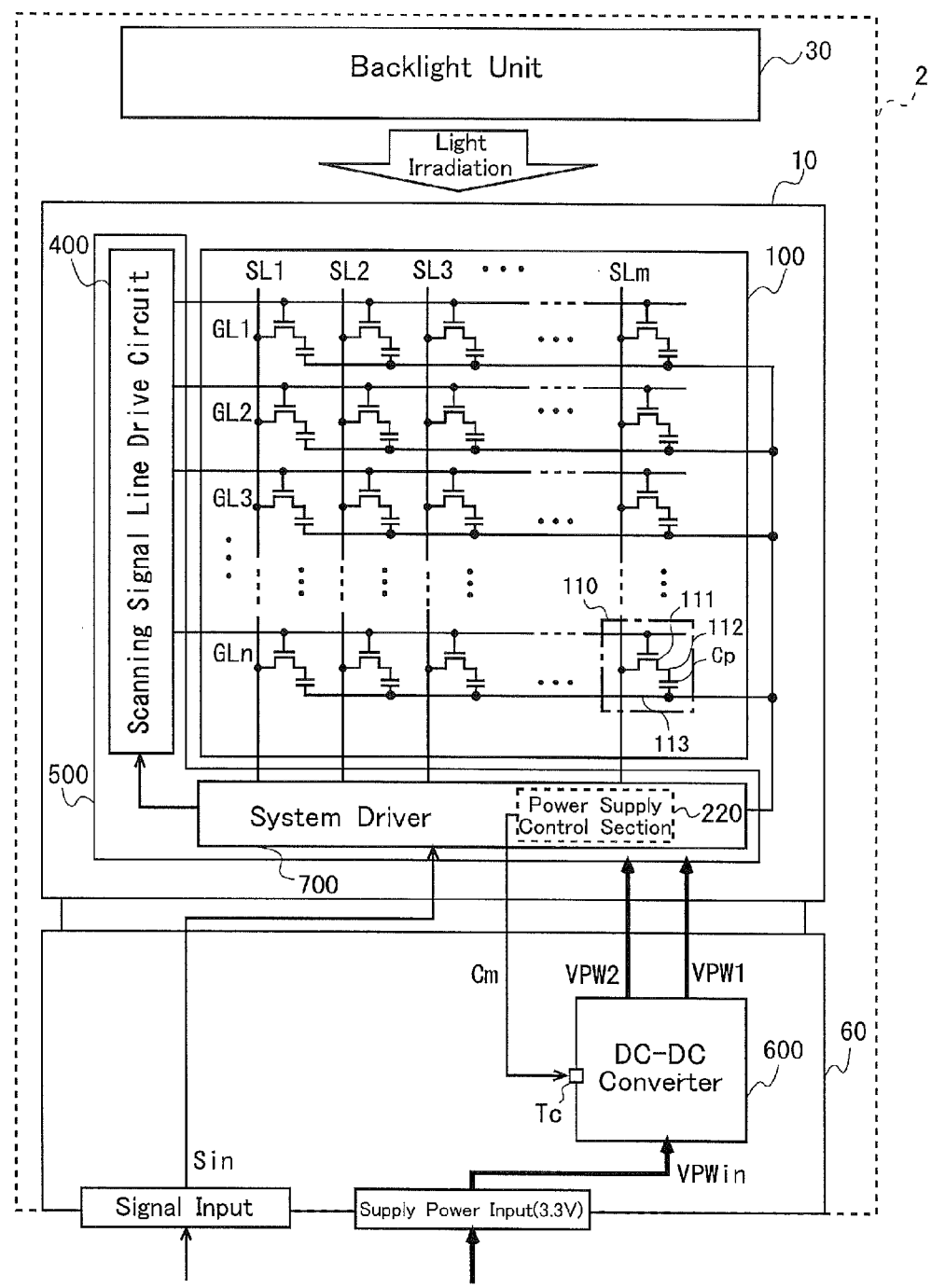
FIG. 14 is a block diagram showing a configuration of a liquid crystal display device according to a third embodiment of the present invention.

FIG. 14 is a block diagram showing a configuration of a liquid crystal display device 2 according to a third embodiment of the present invention. As shown in FIG. 14, the liquid crystal display device 2 includes, as does the first embodiment, a liquid crystal display panel 10, a backlight unit 30, and a printed-circuit board 60. However, the liquid crystal display panel 10 according to the present embodiment includes a system driver 700 in place of the data signal line drive circuit 300 which is used the first embodiment. The system driver 700 is an integrated circuit of the data signal line drive circuit 300 and the display control circuit 200 in the first embodiment. Therefore, the system driver 700 also includes the power supply control section 220 of the first embodiment. In the present embodiment as described above, the external input signal Sin is inputted to the system driver 700 via the printed-circuit board 60. The printed-circuit board 60 is mounted with a DC-DC converter 600, but the display control circuit 200 is excluded from the printed-circuit board 60. This DC-DC converter 600 has the same configuration as in the first embodiment, receives the mode control signal Cm from the power supply control section 220 located inside the system driver 700, operates in accordance with the mode control signal Cm, and thereby converts the level of the externally supplied input supply voltage VPWin, generating a panel supply voltage VPW1 and a logic supply voltage VPW2. These panel supply voltage VPW1 and logic supply voltage VPW2 are supplied to the drive circuit 500 (the system driver 700 and the scanning signal line drive circuit 400). Of these constituent elements of the present embodiment, those which are identical with or corresponding to parts or components in the first embodiment will be indicated with the same reference symbols, and detailed descriptions thereof will not be repeated.

In the present embodiment configured as described, the power supply control section 220 incorporated in the system driver 700 generates mode control signals Cm as shown in FIG. 5 and FIG. 8 like in the first embodiment, and the DC-DC converter 600 operates in accordance with the mode control signals Cm. Therefore, according to the present embodiment, it is also possible, like in the first embodiment, to maintain a high level of power conversion efficiency while supplying a sufficient amount of electric current for driving a large or high-definition liquid crystal display panel, from the power supply circuit (DC-DC converter) to the drive circuit, even in applications where the intermittent driving is utilized. Also, the present embodiment can be varied in the same ways as the first embodiment (see FIG. 9 and FIG. 10). Although FIG. 14 shows an arrangement that the data signal line drive circuit 300 and the display control circuit 200 are integrated in a circuit (typically in a single IC), there may be an arrangement in which this integrated circuit (IC) also includes the scanning signal line drive circuit 400.

<4. Other Variations>

In the first through the third embodiments and their variations, the DC-DC converter operates in a PFM control mode in the non-refreshing period and/or vertical blanking period. However, the present invention is not limited to this, and should include any arrangements in which control mode of the DC-DC converter 600 as a power supply circuit is switched from a PWM control mode to a PFM control mode when power conversion efficiency is decreased to a low level (e.g., not higher than 40%) due to a light load condition. Also, although the DC-DC converter which generates a panel supply voltage VPW1 is designed to operate in a PFM control mode during the period when the drive circuit 500 stops operation of the display section 100 (during the drive-intermission period) under the situation when the liquid crystal display device 2 is in operation, it is not necessary to operate in a PFM control mode throughout the entire drive-intermission period. There may be an arrangement in which such a drive-intermission period includes a period when the DC-DC converter operates in a PWM control mode.

Also, in the first through the third embodiments and their variations, the panel supply voltage VPW1 is made of a voltage obtained by boosting the input supply voltage VPWin or a voltage (negative voltage) obtained by inverting the polarity of the input supply voltage VPWin. However, the present invention is not limited to such an arrangement. For example, supply voltages which constitute the panel power supply VPW1 may include a voltage obtained by stepping down the input supply voltage VPWin. In this case, the DC-DC converter 600 or 601 includes a step-down section such as shown in FIG. 4. It should be noted here that the panel supply voltage VPW1 may consist only of voltages of an identical polarity (positive voltages) made by stepping up or down the input supply voltage VPWin.

Thus far, a liquid crystal display device has been used as an example. However, the present invention is not limited by this, and is applicable also to other display devices such as organic EL (Electro Luminescence) display devices.

INDUSTRIAL APPLICABILITY

The present invention is applied to a display device which includes a power supply circuit that generates a supply voltage by converting a level of a DC voltage, and is suitable particularly to a display device including a large or high-definition display panel which requires intermittent driving.

LEGEND

2 Liquid crystal display device
10 Liquid crystal display panel
100 Display section
110 Pixel formation portion
200 Display control circuit
210 Drive control section
220 Power supply control section
300 Data signal line drive circuit
400 Scanning signal lines drive circuit
500 Drive circuit
600, 610, 620 DC-DC converter
610u Step-up DC-DC converter IC
610d Step-down DC-DC converter IC
Qnu, Qnd N-channel MOS transistors (switching elements)
Qpd P-channel MOS transistor (switching element)
Cm, Cm1, Cm2 Mode control signals
VPWin Input supply voltage
VPW1 Panel supply voltage
VPW2 Logic supply voltage

The invention claimed is:

1. A display device having a supply voltage generation function by converting a level of a DC voltage, comprising:
a display that displays an image;
a drive circuit that drives the display;
a first DC-DC converter which includes a first induction element and a first switching element that changes an electric current passing through the first induction element; converts a level of an externally inputted DC voltage by operating the first switching element; and supplies a DC voltage resulted from the conversion to the drive circuit as a first supply voltage;
a drive controller that controls the drive circuit; and
a power supply controller that controls the first DC-DC converter;
wherein the first DC-DC converter switches a control mode that controls an operation of the first switching element with a mode control signal outputted from the power supply controller between at least two control modes including a first mode and a second mode which provides a higher power conversion efficiency than a power conversion efficiency of the first mode under a predetermined light load condition, wherein
the drive controller generates a vertical synchronization signal which is activated for a predetermined period per one frame based on an external input signal, and
the power supply controller switches the control mode by switching the mode control signal together in synchronization with the vertical synchronization signal so that the first DC-DC converter operates in the first mode when the drive circuit is driving the display, whereas the first DC-DC converter operates in the second mode when the drive circuit is not driving the display; and the control mode is turned to said first mode in synchronization with a first pulse of the vertical synchronization signal and the control mode is turned to said second mode in synchronization with a second pulse of the vertical synchronization signal.

2. The display device according to claim 1, wherein the drive controller controls the drive circuit such that a refreshing period in which a display image in the display is refreshed and a non-refreshing period in which refreshing of a display image in the display is stopped occur in an alternating manner, and wherein
the power supply controller switches the control mode so that the first DC-DC converter operates in the first mode during the refreshing period, and in the second mode during the non-refreshing period.

3. The display device according to claim 2, wherein the drive controller is capable of switching an operation mode of the drive circuit between a normal driving mode in which only the refreshing period occurs repeatedly and an intermittent driving mode in which the refreshing period and the non-refreshing period occur in an alternating manner, and
wherein the power supply controller determines the control mode so that the first DC-DC converter operates in the first mode when the drive circuit is operating in the normal driving mode.

4. The display device according to claim 1, wherein the drive controller switches an operation mode of the drive circuit between a normal driving mode in which only a refreshing period occurs repeatedly and an intermittent driving mode in which the refreshing period and a non-refreshing period occur in an alternating manner, and
wherein the power supply controller switches the control mode so that the first DC-DC converter operates in the first mode when the drive circuit is operating in the normal driving mode whereas the first DC-DC converter operates in the second mode when the drive circuit is operating in the intermittent driving mode.

5. The display device according to claim 1, wherein the first DC-DC converter
controls the operation of the first switching element by a pulse width modulation method in the first mode, and
in the second mode, controls the operation of the first switching element by a pulse frequency modulation method.

6. The display device according to claim 1, wherein the first DC-DC converter
controls the operation of the first switching element by a pulse width modulation method in the first mode,
and in the second mode, switches the method of controlling the operation of the first switching element, between the pulse width modulation method and a pulse frequency modulation method depending on a load of the first DC-DC converter.

7. The display device according to claim 1, further comprising a second DC-DC converter which: includes a second induction element and a second switching element that changes an electric current passing through the second induction element; converts a level of an externally inputted DC voltage by operating the second switching element; and supplies a DC voltage resulted from the conversion to the drive circuit as a second supply voltage;
wherein the second DC-DC converter switches a control mode of controlling an operation of the second switching element between said at least two control modes, and wherein the power supply controller switches the control mode of the first DC-DC converter independently from the control mode of the second DC-DC converter.

8. A supply power generation method of generating a supply voltage in a display device which includes a display that displays an image, a drive circuit that drives the display and a drive controller that controls the drive circuit, the method comprising:

a voltage level conversion step of converting a level of an externally inputted DC voltage by controlling an operation of a switching element thereby changing an electric current passing through an induction element, and outputting a DC voltage resulted from the conversion as the supply voltage; and a supply power control step of switching a control mode that controls the operation of the switching element with a mode control signal outputted from the power supply controller between at least two modes including a first mode and a second mode which provides a higher power conversion efficiency than the first mode under a predetermined light load condition; and a drive control step of generating a vertical synchronization signal which is activated for a predetermined period per one frame based on an external input signal; wherein in the supply power control step, the control mode is switched by switching the mode control signal together in synchronization with the vertical synchronization signal so that operation of the switching element is controlled by the first mode when the drive circuit is driving the display whereas the operation of the switching element is controlled by the second mode when the drive circuit is not driving the display; and the control mode is turned to said first mode in synchronization with a first pulse of the vertical synchronization signal and the control mode is turned to said second mode in synchronization with a second pulse of the vertical synchronization signal.

9. A supply power generation method according to claim 8, wherein the drive controller controls the drive circuit such that a refreshing period in which a display image in the display is refreshed and a non-refreshing period in which refreshing of a display image in the display is stopped occur in an alternating manner, whereas in the supply power control step, the control mode is switched so that the operation of the switching element is controlled in the first mode during the refreshing period, and in the second mode during the non-refreshing period.

10. A display device having a supply voltage generation function by converting a level of a DC voltage, comprising:

a display that displays an image;

a drive circuit that drives the display;

a first DC-DC converter which includes a first induction element and a first switching element that changes an electric current passing through the first induction element; converts a level of an externally inputted DC voltage by operating the first switching element; and supplies a DC voltage resulted from the conversion to the drive circuit as a first supply voltage;

a drive controller that controls the drive circuit;

a power supply controller that controls the first DC-DC converter; and a second DC-DC converter which includes a second induction element and a second switching element that: changes an electric current passing through the second induction element; converts a level of an externally inputted DC voltage by operating the second switching element; and supplies a DC voltage resulted from the conversion to the drive circuit as a second supply voltage; wherein the first DC-DC converter switches a control mode to control an operation of the first switching element between at least two control modes including a first mode and a second mode which provides a higher power conversion efficiency than a power conversion efficiency of the first mode under a predetermined light load condition;

the power supply controller switches the control mode so that the first DC-DC converter operates in the first mode when the drive circuit is driving the display, whereas the first DC-DC converter operates in the second mode when the drive circuit is not driving the display;

the second DC-DC converter switches a control mode of controlling an operation of the second switching element between the at least two control modes; and the power supply controller switches the control mode of the first DC-DC converter independently from the control mode of the second DC-DC converter.

11. The display device according to claim 10, wherein the drive controller controls the drive circuit such that a refreshing period in which a display image in the display is refreshed and a non-refreshing period in which refreshing of a display image in the display is stopped occur in an alternating manner, and the power supply controller switches the control mode so that the first DC-DC converter operates in the first mode during the refreshing period, and in the second mode during the non-refreshing period.

12. The display device according to claim 11, wherein the drive controller switches an operation mode of the drive circuit between a normal driving mode in which only the refreshing period occurs repeatedly and an intermittent driving mode in which the refreshing period and the non-refreshing period occur in an alternating manner, and the power supply controller determines the control mode so that the first DC-DC converter operates in the first mode when the drive circuit is operating in the normal driving mode.

13. The display device according to claim 11, wherein the drive controller switches an operation mode of the drive circuit between a normal driving mode in which only a refreshing period occurs repeatedly and an intermittent driving mode in which the refreshing period and a non-refreshing period occur in an alternating manner, and the power supply controller switches the control mode so that the first DC-DC converter operates in the first mode when the drive circuit is operating in the normal driving mode whereas the first DC-DC converter operates in the second mode when the drive circuit is operating in the intermittent driving mode.

* * * * *